(12) United States Patent
Stancil

(10) Patent No.: US 6,272,584 B1
(45) Date of Patent: Aug. 7, 2001

(54) SYSTEM BOARD WITH CONSOLIDATED EEPROM MODULE

(75) Inventor: Charles J. Stancil, Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/150,804

(22) Filed: Sep. 10, 1998

(51) Int. Cl.[7] .................................................. G06F 13/14

(52) U.S. Cl. .............................. 710/241; 710/10; 710/36; 711/150; 711/147; 714/784

(58) Field of Search .............................. 710/241, 10, 36; 711/150, 147; 714/784

(56) References Cited

U.S. PATENT DOCUMENTS

| | | | |
|---|---|---|---|
| 5,101,490 | * | 3/1992 | Getson, Jr. et al. . |
| 5,416,909 | * | 5/1995 | Long et al. ............................. 710/36 |
| 5,557,621 | * | 9/1996 | Nakano et al. ....................... 714/784 |
| 5,692,111 | * | 11/1997 | Marbry et al. ....................... 395/114 |
| 5,765,036 | * | 6/1998 | Lim ....................................... 711/147 |
| 5,812,867 | * | 9/1998 | Basset ..................................... 712/1 |
| 5,815,167 | * | 9/1998 | Muthal et al. ......................... 345/512 |
| 5,872,998 | * | 2/1999 | Chee .................................... 395/876 |
| 5,911,149 | * | 6/1999 | Luan et al. ............................ 711/147 |
| 6,014,729 | * | 1/2000 | Lannan et al. ....................... 711/150 |

OTHER PUBLICATIONS

Phillips Semiconductors; *The $I^2C$–bus and how to use it*; Apr. 1995; (pp. 1–24).
Xicor®; *Serial $E^2PROM$*; 1991; (pp. 1–16).
Xicor®; *Serial $E^2Prom$*; 1994 (pp. 1–14).
National Semiconductor Corporation; (Microwave™ Bus Interface) *256–/1024–/2048–/4096–Bit Serial EEPROM with Data Protect and Sequential Read*; 1996 (pp. 1–14).

* cited by examiner

Primary Examiner—Thomas Lee
Assistant Examiner—Abdelmoniem Elamin
(74) Attorney, Agent, or Firm—Conley, Rose & Tayon, P.C.; Michael F. Heim; Jonathan M. Harris

(57) ABSTRACT

A computer system is provided with a non-volatile memory module that is shared by a plurality of system components during system initialization. In one embodiment, the computer system comprises a processor for executing program instructions, a memory device for storing data and program instructions, a number of integrated system components for carrying out specialized functions, a bridge logic device for communication between the processor, memory, and system components, and a shared non-volatile memory module for storing configuration information for each of the system components. Each of the integrated system components is configured to retrieve its associated configuration information from the shared non-volatile memory module during initialization, rather than from a dedicated non-volatile memory as is conventionally done. This consolidation of multiple non-volatile memories into a single memory module provides numerous advantages including reduction of cost and required space on the motherboard. The non-volatile memory module may include an arbiter for resolving memory access conflicts, and may further include a bus protocol translator for converting between interfaces implemented by the system components and the interface of a chosen non-volatile memory array where the configuration information is actually stored. In one contemplated embodiment, the non-volatile memory module may be incorporated into the non-volatile system memory where the BIOS is stored. In this embodiment, the non-volatile system memory might be coupled to a system bus through a system interface, and coupled to a number of serial busses through a second interface.

28 Claims, 2 Drawing Sheets

SYSTEM BOARD WITH CONSOLIDATED EEPROM MODULE

BACKGROUND OF THE INVENTION

1. Field of the Invention

The present invention relates generally to a system and method for consolidating separate initialization EEPROMs from various integrated components on a circuit board into a single EEPROM module. More particularly, the present invention relates to an EEPROM module that may include an arbiter and protocol translator configured to allow a shared EEPROM to appear as a dedicated EEPROM to more than one component.

2. Background of the Invention

Early computer systems included a processor (or CPU), random access memory (RAM), and certain peripheral devices such as a floppy drive, a keyboard and a display. These components were typically coupled together using a network of address, data and control lines, commonly referred to as a "bus." As computer technology evolved, it became common to connect additional peripheral devices to the computer through ports (such as a parallel port or a serial port), or by attaching the peripheral devices to sockets on the main system circuit board (or "motherboard") which were connected to the system bus. One early bus that still is in use today is the Industry Standard Architecture (ISA) bus. The ISA bus, as the name implies, was a bus standard adopted by computer manufacturers to permit the manufacturers of peripheral devices to design devices that would be compatible with most computer systems. The ISA bus includes 16 data lines and 24 address lines and operates at a clock speed of 8 MHz. A large number of peripheral components have been developed over the years to operate with the ISA protocol.

The components which connect to a given bus receive data from the other components on the same bus via the bus signal lines. Selected components may operate as "bus masters" to initiate data transfers over the bus. Each component on the bus circuit operates according to a bus protocol that defines the purpose of each bus signal and regulates such parameters as bus speed and arbitration between components requesting bus mastership. A bus protocol also determines the proper sequence of bus signals for transferring data over the bus. As computer systems have continued to evolve, new bus circuits offering heightened functionality have replaced older bus circuits, allowing existing components to transfer data more effectively.

One way in which the system bus has been made more effective is to permit data to be exchanged in a computer system without the assistance of the CPU. To implement this design, a new bus architecture called Extended Industrial Standard Architecture (EISA) was developed. The EISA bus protocol permits system components residing on the EISA bus to obtain mastership of the bus and to run cycles on the bus independently of the CPU. Another bus that has become increasingly popular is the Peripheral Component Interconnect (PCI) bus. Like the EISA bus, the PCI bus provides bus master capabilities to devices connected to the PCI bus. The PCI bus operates at clock speeds of 33 MHz or faster. Current designs contemplate implementing a 100 MHz PCI bus.

To ensure that existing components continue to remain compatible with future generations of computer systems, new computer designs often include many different types of buses. Because different buses operate according to different protocols, bridge devices are used to interface, or bridge, the different buses. Such a scheme permits components coupled to one bus to exchange data with components coupled to another bus.

FIG. 1 illustrates an example of a configuration of various computer components that may be found in a representative prior art computer system. The computer system of FIG. 1 includes a CPU 102 coupled to a bridge logic device 106 via a CPU bus. The bridge logic device 106 is sometimes referred to as a "North bridge" for no other reason than it often is depicted near the top of a computer system drawing. The North bridge 106 also couples to a main memory array 104 by a memory bus, and may further couple to a graphics controller 108 via an accelerated graphics port (AGP) bus. The North bridge 106 couples CPU 102, memory 104, and graphics controller 108 to the other peripheral devices in the system through a primary expansion bus (BUS A) such as a PCI bus or an EISA bus. Various components that understand the bus protocol of BUS A may reside on this bus, such as an audio device 114, an external bus adapter (e.g. an IEEE 1394 interface device) 116, and a network interface card (NIC) 118. These components may be integrated onto the motherboard, as suggested by FIG. 1, or they may be plugged into expansion slots 110 that are connected to BUS A. As technology evolves and higher-performance systems are increasingly sought, there is a greater tendency to integrate many of the devices into the motherboard which were previously separate plug-in components.

If other secondary expansion buses are provided in the computer system, as is typically the case, another bridge logic device 112 is used to couple the primary expansion bus (BUS A) to the secondary expansion bus (BUS B). This bridge logic 112 is sometimes referred to as a "South bridge" reflecting its location vis-à-vis the North bridge 106 in a typical computer system drawing. An example of such bridge logic is described in U.S. Pat. No. 5,634,073, assigned to Compaq Computer Corporation. Various components that understand the bus protocol of BUS B may reside on this bus, such as hard disk controller 122, Flash ROM 124, and Super I/O (input/output) controller 126. Slots 120 may also be provided for plug-in components that comply with the protocol of BUS B.

The Super I/O controller 126 typically interfaces to basic input/output devices such as a keyboard 130, a mouse 132, a floppy disk drive 128, a parallel port, a serial port, and sometimes various other input switches such as a power switch and a suspend switch. The Super I/O controller 126 often has the capability to handle power management functions such as reducing or terminating power to components such as the floppy drive 130, and blocking the clock signals that drive components such as the bridge devices 106, 112 thereby inducing a sleep mode in the expansion buses. The Super I/O controller 126 may further assert System Management Interrupt (SMI) signals to various devices such as the CPU 102 and North bridge 106 to indicate special conditions pertaining to input/output activities such as sleep mode. The Super I/O controller 126 may incorporate a counter or a Real Time Clock (RTC) to track the activities of certain components such as the hard disk 122 and the primary expansion bus, inducing a sleep mode or reduced power mode after a predetermined time of inactivity. The Super I/O controller 126 may also induce a low-power suspend mode if the suspend switch is pressed, in which the power is completely shut off to all but a few selected devices. Exempted devices might be the Super I/O controller 126 itself and NIC 118.

Many of the peripheral components may include a programmable read-only memory (PROM) of some form for initializing configuration registers and providing serial numbers or unique identifiers of one form or another. This technique is popular because the use of PROMs to store device settings advantageously reduces the number of components and reduces design effort. Some bus protocols, such as PCI, require that components be provided with configuration information including a vendor id, a serial number, perhaps a subsystem vendor id, revision numbers, and the like. Typically, PCI peripherals will retrieve this information from the PROMs at power-up and store it in internal configuration registers reserved for this purpose. Electrically erasable PROMs (EEPROMs) are often used with configurable peripheral components since they allow a device's configuration information to be modified and retained indefinitely. Examples of components which would likely include an EEPROM are graphics accelerators, audio devices, NICs, modems, and external bus interfaces (e.g. IEEE 1394, SCSI).

Most EEPROMs have a capacity of at least 128 bytes and support a serial interface such as the Inter IC bus ($I^2C$), Microwire™ bus or the Serial Peripheral Interface (SPI). Normally, less than ⅓ to ½ of the full storage capacity of these EEPROMs is used, and in most cases these EEPROMs are only used during the device's initialization phase (i.e. during power-up). This results in numerous EEPROMs each having excess capacity when peripheral components are integrated onto the motherboard. It would be desirable to have a shared, central EEPROM module that appears as an individual dedicated EEPROM to each of several components in the system, thus minimizing the number of components required on the system board.

SUMMARY OF THE INVENTION

Accordingly, there is provided herein a computer system having a non-volatile memory module that is shared by a plurality of system components. In one embodiment, the computer system comprises a processor for executing program instructions, a memory device for storing data and program instructions, a number of integrated system components for carrying out specialized functions, a bridge logic device for communication between the processor, memory, and system components, and a shared non-volatile memory module for storing configuration information for each of the system components. Each of the integrated system components is configured to retrieve its associated configuration information from the shared non-volatile memory module during initialization, rather than from a dedicated non-volatile memory as is conventionally done. This consolidation of multiple non-volatile memories into a single memory module provides numerous advantages including reduction of cost and required space on the motherboard. The non-volatile memory module may include an arbiter for resolving memory access conflicts, and may further include a bus protocol translator for converting between interfaces implemented by the system components and the interface of a chosen non-volatile memory array where the configuration information is actually stored. In one contemplated embodiment, the non-volatile memory module may be incorporated into the non-volatile system memory where the BIOS is stored. In this embodiment, the non-volatile system memory might be coupled to a system bus through a system interface, and coupled to a number of serial busses through a second interface.

One embodiment as claimed contemplates a system board for a computer that comprises a system bus, a number of system components, and a shared EEPROM module. The system bus is configured to couple a processor to the system components, and each of the system components is configured to access an EEPROM to retrieve configuration information. The shared EEPROM module couples to each of the system components and stores the configuration information for each of the of system components.

Another embodiment as claimed contemplates a method for initializing a computer system that comprises: (i) storing configuration information for a number of system devices in a shared non-volatile memory module; (ii) asserting and releasing a reset signal coupled to a processor and the system components; (iii) and servicing the information requests to the shared non-volatile memory module. When the reset signal is released in step (ii), the system components initiate information requests to the shared non-volatile memory module for configuration information.

BRIEF DESCRIPTION OF THE DRAWINGS

A better understanding of the present invention can be obtained when the following detailed description of the preferred embodiment is considered in conjunction with the following drawings, in which.

Figure 1:
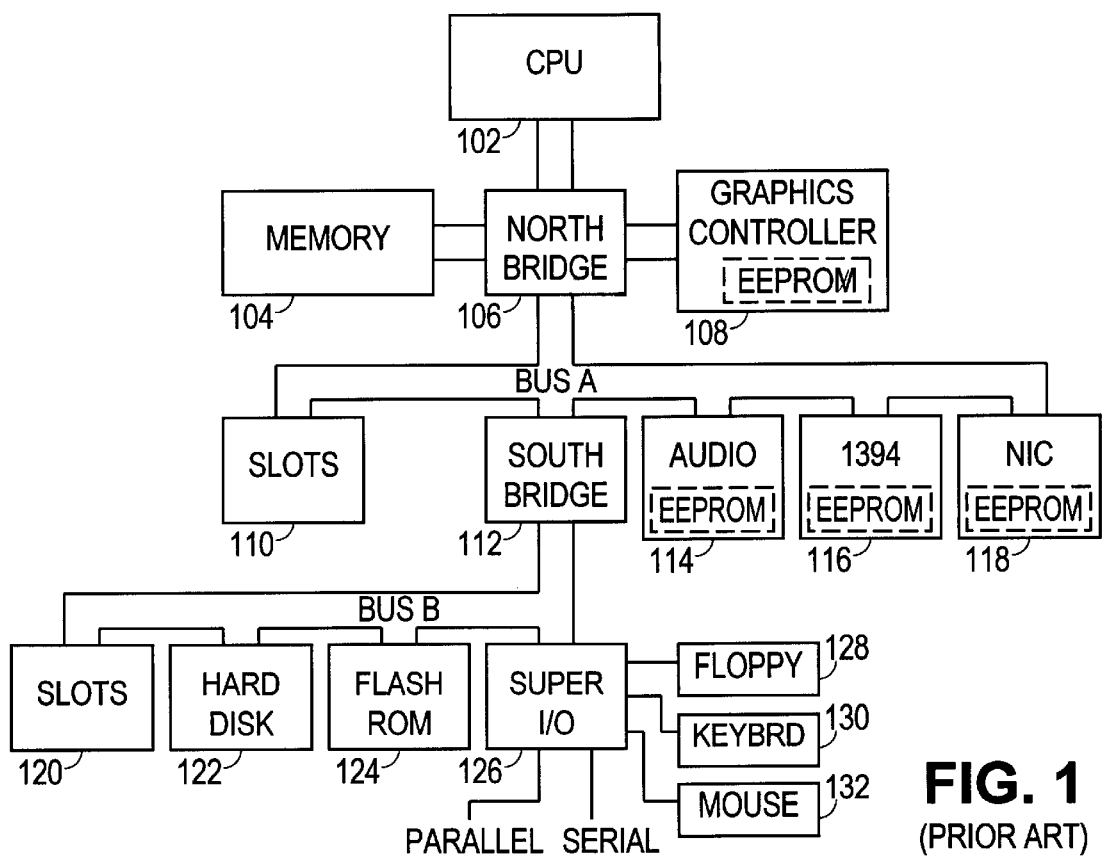
FIG. 1 is a block diagram of a prior art computer system that comprises various system components coupled together by bus logic.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

In addition, certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF PREFERRED EMBODIMENTS

Figure 2:
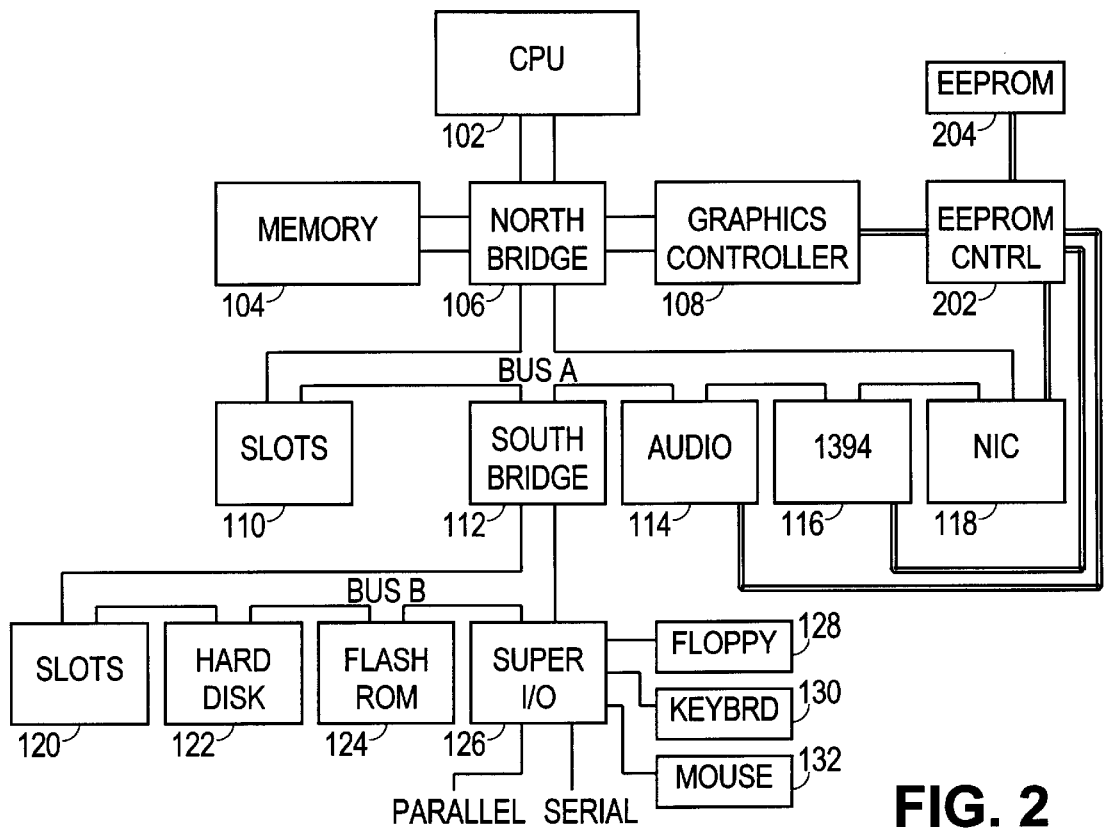
FIG. 2 is a block diagram of a computer system according to the present invention with a shared central EEPROM module.

Referring now to FIG. 2, an exemplary computer system constructed in accordance with a preferred embodiment generally includes an EEPROM controller 202 and a central, shared EEPROM 204, in addition to the various other standard computer system components, such as CPU 102, main memory 104, north bridge 106, graphics controller 108, primary expansion bus slots 110, south bridge 112, audio device 114, external bus adapter 116, NIC 118, secondary bus slots 120, hard disk controller 122, flash ROM 124, Super I/O module 126, floppy disk 128, keyboard 130, and mouse 132. As one of skill in the art will understand, many alternate configurations of some or all of the standard system components shown may be employed without violating the spirit of the present invention. Graphics controller 108, audio device 114, external bus adapter 116, and NIC 118 are illustrative of peripheral components that may be provided as part of a standard computer system motherboard. As technology evolves and manufacturers become more sophisticated, the number of peripheral components integrated into the motherboard will probably increase, and it will become common to integrate various other system components. In the prior art, exemplary components 108 (graphics controller), 114 (audio controller), 116 (external bus adapter), 118 (network interface) would conventionally include a dedicated EEPROM for storing configuration information for retrieval during system initialization. In the present invention shown in FIG. 2, these devices preferably do not include a dedicated EEPROM. In accordance with a preferred embodiment an EEPROM controller 202 couples to a graphics controller 108, audio controller 114, external bus adapter 116, and NIC 118. The EEPROM controller 202 also preferably couples to an integrated EEPROM 204. Together controller 202 and EEPROM 204 form a central, shared EEPROM module. All the information which normally would be stored separately in the various dedicated EEPROMs is stored in EEPROM 204, and EEPROM controller 202 operates to service all EEPROM access requests from the various system components. In this manner the number of EEPROM chips on a system motherboard can be reduced, thereby reducing costs and the amount of space required on the motherboard. A time savings may also be realized since it is necessary to program only a single EEPROM, and the motherboard assembly time may be reduced since fewer components need to be placed. A gain in reliability may also be realized by the presence of fewer components.

As the various components may each expect a dedicated EEPROM, the EEPROM controller 202 may have to emulate a different EEPROM interface for each component. For example, the graphics controller 108 may use a Microwire™ bus for communicating with the EEPROM controller 202, while the NIC 118 could be using an SPI (Serial Peripheral Interface) bus and the external bus adapter 116 could be using an I²C bus. Since the EEPROM 204 preferably uses only one bus standard, one embodiment of the EEPROM controller 202 provides translation between bus protocols.

One of skill in the art will understand that as the computer system exits the reset mode, the various system components will undergo an initialization process. During the initialization process the components coupled to the EEPROM controller 202 will, in no particular order and generally in parallel, begin making EEPROM information requests to controller 202.

In one embodiment, EEPROM controller 202 and EEPROM 204 operate at a sufficiently high speed to service all information requests concurrently, without having to resort to an arbitration process that forces one or more components to wait while another is being serviced. For example, if at most four information requests may be simultaneously received by the EEPROM controller 202 on 12 kHz busses, the EEPROM controller 202 may use a 1 MHz bus to retrieve the first reply byte for each request from EEPROM 204 and place the reply information in outgoing buffers within one clock cycle of the slower busses. For this embodiment, a high-speed (1 MHz) extension of the SPI bus may be used for coupling the controller 202 to the EEPROM 204.

In another embodiment, at most one system component is wait-state intolerant (for example, a component which couples to the controller 202 via a Microwire™ bus), and the controller 202 employs an arbitration scheme to determine the order in which information requests get serviced. Understandably, the wait-state intolerant device would be given the highest priority, while the other devices that tolerate wait-states take turns receiving EEPROM access. Illustratively, when an information request from a wait-state intolerant component and three information requests from other components are simultaneously received by EEPROM controller 202, the EEPROM controller 202 places the other components in a wait state until the information request from the wait-state intolerant component has been serviced. The three pending information requests may then be serviced on a round-robin basis.

In a hybrid embodiment, the EEPROM module operates fast enough to support multiple wait-state intolerant components, but must still employ wait-states on those devices which will tolerate them in order to service all information requests. For example, if at most two information requests from wait-state intolerant components and two more information requests are received from other components, the controller 202 may place the wait-state tolerant components into wait states, and retrieve the first reply bytes and place them in the outgoing buffers for the wait-state intolerant components within one clock cycle of the slower busses. Advantageously, the bus speed between the controller 202 and EEPROM 204 does not have to operate at as high a speed as the first described embodiment, and multiple wait-state intolerant components can be serviced.

Components which couple to the controller 202 by SPI or I²C busses may be tolerant of wait states. The SPI bus and I²C bus standards provide a means by which the EEPROM controller 202 may force components coupled to the controller by these busses to enter a wait-state. This preferably allows the controller 202 to arbitrate between concurrent information requests from different components. The I²C bus standard, in particular, is now described.

The I²C bus standard employs a signal data line (SDA) and a signal clock line (SCL). Both these lines are driven in open-collector fashion with pull-up resistors for raising the signal logic level high when none of the devices is actively pulling the line down to a low signal logic level. A device which initiates a data transfer on the bus becomes a bus master, and begins by driving the SDA line low followed by the SCL line. If everything proceeds normally, all subsequent transitions on the SDA line take place during the upswing of the SCL line. Any other device coupled to the bus can "stall" the transfer of data by holding the SCL line low, i.e. not allowing an upswing to occur. In this manner, an EEPROM access request by system components that employ the I²C bus can be put "on hold" by controller 202 if the controller 202 is providing access to a different component. More details on the I²C bus and the other bus standards can be found be referring to the published specifications and much of the EEPROM product literature. The I²C bus specifically is discussed in "The I²C-bus and how to use it (including specifications)" publication by Philips Semiconductors (April 1995), which is hereby incorporated by reference.

EEPROM 204 may be pre-programmed with configuration information for the various system components before the EEPROM is installed on the board, or after installation during in-circuit test (ICT) of the motherboard. The EEPROM 204 stores the configuration information for all the system components coupled to the controller 202. Each component is allotted storage space in the EEPROM 204, and the controller 202 is provided with a corresponding address map. The mapping scheme for the various component allotments may use fixed block sizes for simplicity or variable length blocks for better efficiency (in terms of smaller required EEPROM capacity). In addition to the configuration information for the system components, the EEPROM may include information about the serial interface type being used by each of the system components and their tolerance of wait-states.

In addition to the data that would normally be stored in the dedicated EEPROMs, the EEPROM 204 may also include configuration information for EEPROM controller 202. For example, the address or identification that the EEPROM controller 202 is expected to respond to for each bus may be stored in EEPROM 204. In one embodiment, controller 202 is a general purpose microcontroller that may store software in EEPROM 204.

Figure 3:
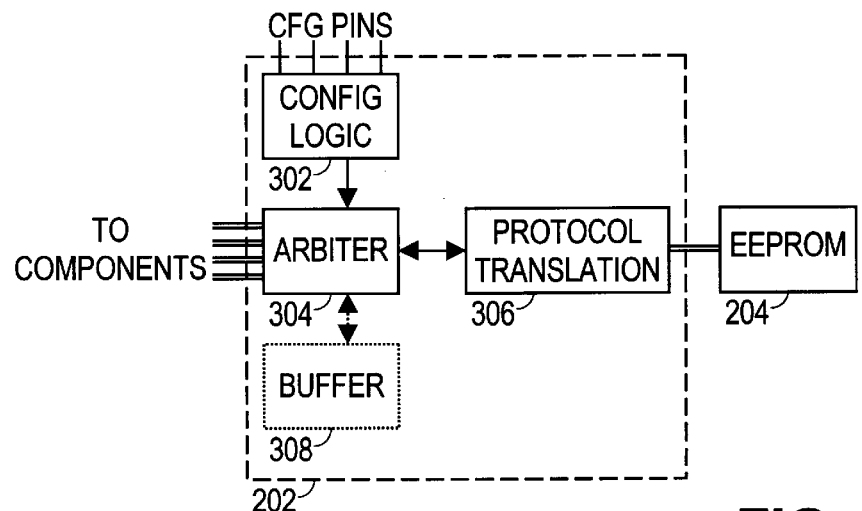
FIG. 3 is a block diagram of a first embodiment of a shared central EEPROM module.

FIG. 3 shows a functional block diagram of one embodiment of EEPROM controller 202. The controller 202 is shown comprising the functional blocks of configuration logic 302, arbiter 304, protocol translator 306, and optionally buffer 308. It should be understood that controller 202 may be implemented using a general purpose microcontroller that executes special purpose software, and may alternatively be implemented using an application-specific integrated chip (ASIC). Also, although the EEPROM 204 is shown as an external device, it is contemplated that the EEPROM 204 and the controller 202 may be integrated onto the same chip.

In the embodiment of FIG. 3, each bus to which the arbiter 304 is coupled is provided with a set of configuration pins. By tying the configuration pins to high or low logic levels, the systems engineer may "program" the controller with the characteristics of each of the incoming busses. These characteristics may include the bus type (e.g. SPI, I$^2$C, Microwire™, etc.) and wait-state tolerance (e.g. wait-state allowed, no wait-state allowed). The configuration logic 302 processes the pin states and alters the function of the arbiter 304 as appropriate. The configuration pins may be eliminated if the corresponding configuration information is stored in EEPROM 204. In any case, it may be desired to provide a set of configuration pins for specifying the bus interface employed by EEPROM 204, particularly if EEPROM 204 is a separate chip.

The arbiter 304 preferably monitors the bus transactions initiated by the integrated components and handles all information requests as they occur. The handling preferably includes (1) receiving an information request, (2) determining if the request is material (i.e. directed to an EEPROM location within the central EEPROM module), (3) determining the priority of material requests, (4) placing requests in a queue according to priority and possibly interrupting ongoing information transactions of lower priority, (5) placing requests in the queue "on hold"(6) retrieving a request from the top of the queue and conducting an information transaction in response to the information request if no other transaction is being conducted and the queue is not empty. The conducting of the information transaction preferably takes the form of providing the information request to protocol translator 306 and receiving the response in ready-to-transmit form. Then the arbiter 304 preferably transmits the response to the requesting component. When the controller 202 uses a high-speed bus to communicate with EEPROM 204, the arbiter 304 is preferably provided with a buffer 308 for buffering responses to information requests.

In this embodiment, the arbiter 304 preferably begins servicing the next information request while the response to the previous information request is still being transmitted.

Protocol translator 306 is coupled to EEPROM 204 to make information requests and to receive responses from EEPROM 204. In a preferred embodiment, an SPI bus couples translator 306 to EEPROM 204. The arbiter 304 transfers an information request to translator 306 to be translated and relayed to EEPROM 204. The translator 306 preferably converts the information request from the incoming bus protocol into the SPI protocol. Similarly, translator 306 preferably converts the response from the SPI protocol back into the original bus protocol. It is expected that in an ASIC, the translator 306 could be implemented using a relatively simple state machine. It should also be understood that other bus protocols including I$^2$C and Microwire™ could be used to communicate between the controller 202 and the EEPROM 204.

Figure 4:
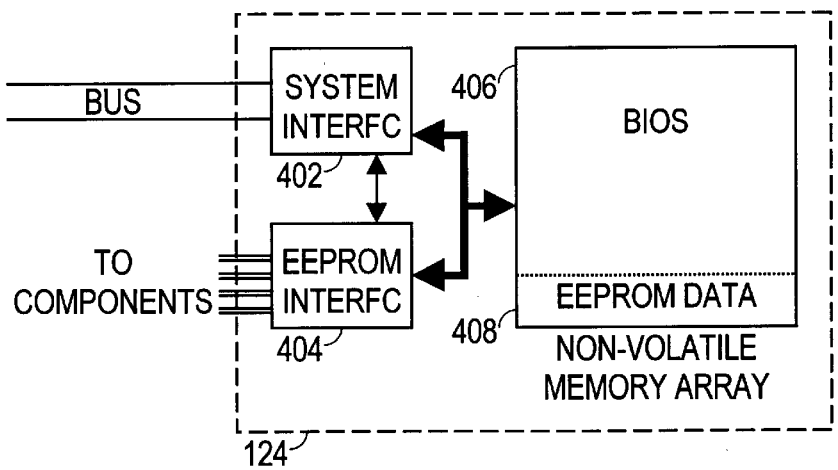
FIG. 4 is a block diagram of second embodiment of a shared central EEPROM module.

Referring now to FIG. 4, an alternate embodiment is shown in which the central EEPROM module is incorporated into flash ROM 124. In the embodiment of FIG. 4, the non-volatile memory array of Flash ROM 124 is divided into a BIOS area 406 and an EEPROM DATA area 408. The BIOS area 406 is accessed by the CPU 102 in the normal fashion, i.e. via a system bus and a system interface 402. System components are coupled to the EEPROM DATA area 408 via an EEPROM interface 404. Since it is not unlikely that CPU 102 would be accessing the BIOS at roughly the same time the various system components are trying to access their EEPROM information, the system interface 402 and the EEPROM interface 404 may be configured to coordinate their accesses to the non-volatile memory array. As the CPU 102 is normally wait-state tolerant, EEPROM interface 404 may control the overall arbitration for access to the non-volatile memory array. It is expected that this embodiment would result in the greatest savings of space on the motherboard.

Hence, a central, shared EEPROM module has been disclosed which provides advantages in terms of cost and space savings when various system components are integrated onto the system board. In particular, an embodiment has been disclosed which permits a single EEPROM chip to be shared by multiple devices that may each be configured for a dedicated EEPROM chip. Numerous variations and modifications will become apparent to those skilled in the art once the above disclosure is fully appreciated. For example, other non-volatile memories types may be shared in this fashion, including ROMs, and PROMs. Further, various well-known arbitration methods, including e.g. the round-robin method, may be employed for sharing access to the central shared memory. Additionally, the use of other interfaces than those described herein is contemplated. Another variation may involve providing the system components access to the shared EEPROM module via a shared bus such as the I$^2$C bus which may be configured as a shared bus. It is intended that the following claims be interpreted to embrace all such variations and modifications.

What is claimed is:

1. A system board for a computer, wherein the system board comprises;
   a system bus configured to couple to a processor;
   a plurality of system components coupled to the system bus, wherein upon being initialized, each of the plurality of system components is configured to access an EEPROM to retrieve configuration information; and
   a shared EEPROM module coupled to each of the plurality of system components and which stores configuration information to be provided to each of the plurality of system components, wherein said EEPROM module provides configuration information to said plurality of system components, wherein said EEPROM module resolves access conflicts in accordance with a system component priority.

2. The system board of claim 1, wherein the plurality of system components includes a network interface controller.

3. The system board of claim 1, wherein the plurality of system components includes a graphics controller.

4. The system board of claim 1, wherein the plurality of system components includes an audio device.

5. The system board of claim 1, wherein the plurality of system components includes an external bus adapter.

6. The system board of claim 5, wherein the external bus adapter is a SCSI controller.

7. The system board of claim 5, wherein the external bus adapter is an IEEE 1394 interface.

8. The system board of claim 1, wherein one of the plurality of system components is coupled to the shared EEPROM module by an $I^2C$ bus.

9. The system board of claim 1, wherein one of the plurality of system components is coupled to the shared EEPROM module by an SPI bus.

10. The system board of claim 1, wherein one of the plurality of system components is coupled to the EEPROM module by a Microwire bus.

11. The system board of claim 1, further comprising:
a processor for executing program instructions;
a memory device coupled to said processor for storing data and program instructions;
a bridge logic device coupled to the processor, the memory device, and the system bus, and configured to permit the processor to transfer information to the memory device and the plurality of system components.

12. A system board for a computer, wherein the system board comprises:
a system bus configured to couple to a processor;
a plurality of system components coupled to the system bus, wherein upon being initialized, each of the plurality of system components is configured to access an EEPROM to retrieve configuration information; and
a shared EEPROM module coupled to each of the plurality of system components and which stores configuration information for each of the plurality of system components; and
wherein the shared EEPROM module comprises:
an EEPROM array configured to store configuration information for each of the plurality of system components; and
a controller coupled to each of the plurality of system components and further coupled to the EEPROM array, wherein the controller is configured to receive an information request from one of the plurality of system components, and wherein the controller is configured to retrieve configuration information from the EEPROM array and to provide the configuration information to said one of the plurality of system components in response to the information request.

13. The system board of claim 12, wherein the controller is coupled to the EEPROM array by an SPI bus.

14. The system board of claim 12, wherein the controller is coupled to the EEPROM array by an $I^2C$ bus.

15. The system board of claim 12, wherein the controller is coupled to the EEPROM array by a Microwire bus.

16. The system board of claim 12, wherein the controller comprises:
an arbiter configured to receive information requests from the plurality of system components and configured to determine an order in which the information requests will be serviced.

17. The system board of claim 16, wherein the controller further comprises:
a translator configured to convert an information request from a first bus protocol to a second bus protocol, and to transmit the converted information request to the EEPROM array, wherein the translator is configured to receive configuration information from the EEPROM array and configured translate the received configuration information from the second bus protocol to the first bus protocol.

18. The system board of claim 16, wherein the arbiter is further configured to force system components associated with stalled information requests into a wait state.

19. A computer system comprising;
a processor for executing program instructions;
a memory device for storing data and program instructions;
at least two system components for carrying out specialized functions;
a bridge logic device coupled to the processor, the memory, and the system components and configurable to transfer information between the processor and the memory device, between the processor and the system components, and between the memory and the system components; and
a shared non-volatile memory module for storing configuration information for each of the system components, wherein each of the system components is coupled to the shared non-volatile memory module to retrieve configuration information during initialization of the system components, wherein said shared non-volatile memory module resolves access conflicts in accordance with a system component priority.

20. The computer of claim 19, wherein each of the plurality of system components is coupled to the shared non-volatile memory module by a respective dedicated serial interface.

21. The computer of claim 20, wherein at least one of the plurality of system components is coupled to the non-volatile memory module by an $I^2C$ bus.

22. The computer of claim 19, wherein each of the plurality of system components is coupled to the shared non-volatile memory module by a shared bus that operates independently of the bridge logic device.

23. The computer of claim 19, wherein the shared non-volatile memory module is further coupled to the bridge logic device, and wherein the processor is configured to retrieve BIOS information from the shared non-volatile memory module during system initialization.

24. A computer system comprising:
a processor for executing program instructions;
a memory device for storing data and program instructions;
at least two system components for carrying out specialized functions;
a bridge logic device coupled to the processor, the memory, and the system components and configurable to transfer information between the processor and the memory device, between the processor and the system components, and between the memory and the system components; and a shared non-volatile memory module for storing configuration information for each of the system components, wherein each of the system components is coupled to the shared non-volatile memory module to retrieve configuration information during initialization of the system components;

wherein the shared non-volatile memory module comprises:

an non-volatile memory array configured to store configuration information for each of the plurality of system components; and a controller coupled to each of the plurality of system components and further coupled to the non-volatile memory array, wherein the controller is configured to receive an information request from one of the plurality of system components, and wherein the controller is configured to retrieve configuration information from the non-volatile memory array and to provide the configuration information to said one of the plurality of system components in response to the information request.

25. A method for initializing a computer system, wherein the method comprises:

storing configuration information for a plurality of system devices in a shared non-volatile memory module;

asserting and releasing a reset signal coupled to a processor and a plurality of system components, wherein when the reset signal is released, the system components are configured to initiate information requests to the shared non-volatile memory module for configuration information; and servicing the information requests from the shared non-volatile memory module;

wherein the servicing includes:

receiving the information requests;

determining an order for servicing concurrent information requests;

retrieving configuration information from a non-volatile memory array in response to a highest-priority request from one of the plurality of system components; and providing the configuration information to said one of the plurality of system components.

26. The method of claim 25, further comprising:

translating the highest-priority request from a first bus protocol to a second bus protocol; and translating the retrieved configuration information from the second bus protocol to the first bus protocol.

27. A shared non-volatile memory module which comprises:

a non-volatile memory array configured to store configuration information for a plurality of peripheral components;

a controller coupled to the non-volatile memory array to retrieve configuration in response to information requests from the peripheral components, wherein the controller is configured to be coupled to each of the plurality of peripheral components by corresponding dedicated serial interfaces to receive and respond to the information requests.

28. The shared non-volatile memory module of claim 27, wherein each of the plurality of peripheral components is configured to generate the information requests during initialization of the peripheral components.

* * * * *

UNITED STATES PATENT AND TRADEMARK OFFICE
CERTIFICATE OF CORRECTION

PATENT NO.    : 6,272,584 B1
DATED         : August 7, 2001
INVENTOR(S)   : Charles J. Stancil It is certified that error appears in the above-identified patent and that said Letters Patent is hereby corrected as shown below:

<u>Title page,</u>
Item [54], should read as follows: -- SYSTEM FOR PROVIDING CONFIGURATION INFORMATION STORED IN A SHARED EEPROM TO A PLURALITY OF SYSTEM COMPONENTS IN ACCORDANCE WITH A SYSTEM COMPONENT PRIORITY --

Signed and Sealed this

Twentieth Day of August, 2002

*Attest:*

*Attesting Officer*

JAMES E. ROGAN
*Director of the United States Patent and Trademark Office*